US006986306B2

(12) United States Patent
McKillip

(10) Patent No.: US 6,986,306 B2
(45) Date of Patent: Jan. 17, 2006

(54) METHOD AND APPARATUS FOR PRODUCING MULTIPLE DIE-CUT BUSINESS FORMS

(75) Inventor: John J. McKillip, Chicago, IL (US)

(73) Assignee: Malessa Partners, L.L.C., Rockford, IL (US)

(*) Notice: Subject to any disclaimer, the term of this patent is extended or adjusted under 35 U.S.C. 154(b) by 301 days.

(21) Appl. No.: 10/395,564

(22) Filed: Mar. 24, 2003

(65) Prior Publication Data

US 2003/0167944 A1 Sep. 11, 2003

Related U.S. Application Data

(63) Continuation of application No. 10/004,510, filed on Nov. 2, 2001, which is a continuation of application No. 09/700,065, and a continuation-in-part of application No. PCT/US99/19475, filed on Aug. 26, 1999, now Pat. No. 6,389,971, which is a continuation of application No. 09/199,512, filed on Nov. 25, 1998, now Pat. No. 6,182,572, which is a continuation-in-part of application No. 09/143,927, filed on Aug. 29, 1998, now abandoned.

(51) Int. Cl.
*B32B 31/00* (2006.01)
*B41F 13/56* (2006.01)

(52) U.S. Cl. ........................ 101/226; 156/177; 428/40.1

(58) Field of Classification Search ................. 101/226, 101/227, 248, 494, 118, 127.1, 467; 428/40.1, 428/42–43, 34, 187, 195, 423.3, 35.4, 41.5; 156/277, 204, 257, 64, 248–249, 253, 268, 156/270, 177, 273.1, 264; 53/429, 435, 460–462, 53/116, 206, 570; 283/81, 107; 522/99

See application file for complete search history.

(56) References Cited

U.S. PATENT DOCUMENTS

| | | |
|---|---|---|
| 3,291,044 A | 12/1966 | Van Der Winden |
| 3,726,710 A | 4/1973 | Berger et al. |
| 3,861,912 A | 1/1975 | Ibrahim |
| 3,863,567 A | 2/1975 | Hastings |
| 4,021,060 A | 5/1977 | Seeley et al. |
| 4,379,573 A | 4/1983 | Lomeli et al. |
| 4,461,661 A | 7/1984 | Fabel |
| 4,470,348 A | 9/1984 | Seeley et al. |
| 4,495,582 A | 1/1985 | Dessert et al. |
| 4,512,256 A | 4/1985 | Schriber et al. |

(Continued)

FOREIGN PATENT DOCUMENTS

| | | |
|---|---|---|
| WO | WO 00/12224 A1 | 3/2000 |
| WO | WO 01/26892 A1 | 4/2001 |

OTHER PUBLICATIONS

Letter to Mark Hetzler from David Steidinger dated Nov. 23, 1999 (9 pages).
Letter to Jim Schulty from David Steidinger dated May 13, 1999 (12 pages).
Letter to Jim Schulty from David Steidinger dated May 11, 1999 (3 pages).
Letter to Jim Schulty from Gayle Harrop dated May 7, 1999 (1 page).
Drawing No. 920629, entitled "Proposal for UARCO Business Forms" and dated Jun. 29, 1992 (1 sheet).

(Continued)

*Primary Examiner*—Eugene H. Eickholt
(74) *Attorney, Agent, or Firm*—Fitch, Even, Tabin & Flannery

(57) ABSTRACT

A method and apparatus for manufacturing multiple die cut business forms is disclosed. One embodiment of a printing press according to the present invention includes a number of different stations that are connected together by a continuos web. Multiple die cut business forms are produced by a continuos process from stock paper to an output configuration such as continuos roll, fan fold, or cut sheet. One aspect of the present invention is that a silicone treated glassine stock paper substrate can be utilized to allow business forms to be produced with minimized curling.

18 Claims, 2 Drawing Sheets

U.S. PATENT DOCUMENTS

| | | | | | |
|---|---|---|---|---|---|
| 4,664,031 | A | | 5/1987 | McKillip | |
| 4,709,850 | A | | 12/1987 | Wagner | 229/303 |
| 4,715,530 | A | | 12/1987 | Leese et al. | 229/303 |
| 4,824,503 | A | | 4/1989 | Wilen | 156/204 |
| 4,830,269 | A | | 5/1989 | Jenkins | |
| 4,839,814 | A | | 6/1989 | Steidel | |
| 4,854,610 | A | | 8/1989 | Kwiatek | |
| 4,960,482 | A | | 10/1990 | Crane et al. | |
| 4,977,006 | A | | 12/1990 | Smith et al. | |
| 5,011,559 | A | | 4/1991 | Felix | |
| 5,021,110 | A | | 6/1991 | Kobayashi | |
| 5,041,072 | A | | 8/1991 | McClelland | |
| 5,078,375 | A | | 1/1992 | Steidinger | |
| 5,086,683 | A | | 2/1992 | Steidinger | |
| 5,098,759 | A | | 3/1992 | Felix | |
| 5,125,563 | A | | 6/1992 | Lombardo | 229/71 |
| 5,129,682 | A | | 7/1992 | Ashby | |
| 5,143,466 | A | | 9/1992 | Baldwin | |
| 5,154,344 | A | | 10/1992 | Loch | 229/304 |
| 5,211,096 | A | | 5/1993 | Steidinger | |
| 5,224,408 | A | | 7/1993 | Steidinger | |
| 5,238,182 | A | | 8/1993 | Loch | |
| 5,262,214 | A | | 11/1993 | Instance | |
| 5,320,387 | A | | 6/1994 | Carlson | |
| 5,324,153 | A | | 6/1994 | Chess | |
| 5,337,663 | A | | 8/1994 | McKillip | |
| 5,351,426 | A | | 10/1994 | Voy et al. | |
| 5,381,947 | A | | 1/1995 | Steidinger | |
| 5,405,076 | A | | 4/1995 | Steidinger | |
| 5,427,832 | A | | 6/1995 | Longtin | |
| 5,441,796 | A | | 8/1995 | Steidinger et al. | |
| 5,462,488 | A | | 10/1995 | McKillip | |
| 5,466,013 | A | | 11/1995 | Garrison | |
| 5,507,901 | A | | 4/1996 | Limina et al. | |
| 5,520,766 | A | * | 5/1996 | Iwasaki | 156/277 |
| 5,540,148 | A | | 7/1996 | Oumiya et al. | |
| 5,562,789 | A | | 10/1996 | Hoffmann | 156/64 |
| 5,580,640 | A | | 12/1996 | Kraft et al. | |
| 5,632,842 | A | | 5/1997 | Oliver et al. | |
| 5,640,831 | A | | 6/1997 | Harrod et al. | 53/429 |
| 5,640,835 | A | | 6/1997 | Muscoplat | |
| 5,656,369 | A | | 8/1997 | Chess et al. | 428/331 |
| 5,657,529 | A | | 8/1997 | Bohn et al. | |
| 5,674,334 | A | | 10/1997 | Instance | |
| 5,700,536 | A | | 12/1997 | Steidinger | |
| 5,707,475 | A | | 1/1998 | Steidinger et al. | 156/257 |
| 5,766,401 | A | | 6/1998 | Campbell | |
| 5,776,289 | A | | 7/1998 | Steidinger | |
| 5,782,691 | A | | 7/1998 | Stewart | |
| 5,807,623 | A | | 9/1998 | Chess | 428/195.1 |
| 5,842,722 | A | | 12/1998 | Carlson | |
| 5,861,457 | A | | 1/1999 | Weidner et al. | |
| 5,869,148 | A | * | 2/1999 | Silverschotz et al. | 427/549 |
| 5,873,607 | A | | 2/1999 | Waggoner | |
| 5,876,784 | A | | 3/1999 | Hesselmann | |
| 5,890,743 | A | | 4/1999 | Garrison et al. | |
| 5,928,748 | A | | 7/1999 | Jones et al. | |
| 5,941,451 | A | | 8/1999 | Dexter | |
| 5,951,054 | A | | 9/1999 | Hagen | |
| 5,961,766 | A | * | 10/1999 | Chang et al. | 156/247 |
| 5,981,013 | A | | 11/1999 | Russ et al. | |
| 6,013,693 | A | | 1/2000 | Takahashi et al. | |
| 6,022,051 | A | * | 2/2000 | Casagrande | 283/107 |
| 6,027,780 | A | | 2/2000 | Treleaven et al. | |
| 6,030,482 | A | | 2/2000 | Osaka | |
| 6,051,311 | A | | 4/2000 | Osaka | |
| 6,071,585 | A | | 6/2000 | Roth | |
| 6,077,611 | A | | 6/2000 | Griswold et al. | |
| 6,086,694 | A | | 7/2000 | Winter et al. | |
| 6,090,483 | A | * | 7/2000 | Kume et al. | 428/354 |
| 6,174,579 | B1 | | 1/2001 | Slyster et al. | 428/40.1 |
| 6,177,163 | B1 | | 1/2001 | Blok et al. | |
| 6,182,572 | B1 | * | 2/2001 | McKillip | 101/494 |
| 6,190,747 | B1 | | 2/2001 | Fischer | |
| 6,191,382 | B1 | * | 2/2001 | Damikolas | 219/121.62 |
| 6,217,078 | B1 | | 4/2001 | Roth et al. | |
| 6,218,006 | B1 | * | 4/2001 | Tokunaga et al. | 428/41.5 |
| 6,235,363 | B1 | * | 5/2001 | Bilodeau | 428/40.1 |
| 6,389,971 | B1 | * | 5/2002 | McKillip | 101/494 |
| 2002/0146551 | A1 | * | 10/2002 | Freedman et al. | 428/220 |
| 2003/0021930 | A1 | * | 1/2003 | Mientus et al. | 428/40.1 |

OTHER PUBLICATIONS

Drawing No. 921014, entitled "Hamilton Jumbo/Stencil–Label Applicator" and dated Oct. 14, 1992 (1 sheet).

Document entitled "Label/Form Combinations New Ideas for the Growing Market" and dated 1993 (15 pages).

Document entitled "Label/Form Combinations New Ideas for the Growing Market" (no date shown)(8 pages).

Drawing No. 930710, entitled "F300R Top Loading–Turn Pin Band Rotary Collator" and dated Jan. 24, 1992 (1 sheet).

Document entitled "formsmfg"and dated Aug. 1993 (2 pages).

Document entitled "Form Your Future With Flexible Manufacturing" (no date shown) (2 pages).

Drawing No. 930928, entitled "Tamarack Label Application In–Line Installation With Hamilton 28"D. Roll 20"Web Collator for General Business Forms" and dated Sep. 27, 1993 (1 sheet).

Document entitled "General Business Form" and dated Oct. 29, 1993 (3 pages).

Document entitled "Tamarack Products Inc. Invoice No. 940921" and dated Sep. 21, 1994 (3 pages).

Drawing No. 931012, entitled "Proposal for Uarco–In Line Installation Of Tamarack Window Patch Applicator for Didde Web Press" (no date shown) (1 sheet).

Document entitled "Purchase Order No. BA–067631" and dated Dec. 13, 1993 (10 pages).

Document entitled "Tamarack Products Inc. Invoice No. 940817" and dated Aug. 17, 1994 (1 page).

Document entitled "Tamarack Products Inc. Invoice No. 941221" and dated Dec. 21, 1994 (1 page).

Document entitled "A New Day Is Dawning In the Business Forms Industry" (no date shown) (4 pages).

Document entitled "Digipress 300XE/C" (no date shown) (2 pages).

Document entitled "Tamarack Label Applicator"and dated Dec. 1993 (12 pages).

Document entitled "Showplace Exhibitors Product Index" and dated Apr. 10–13, 1994 (2 pages).

Document entitled "Formations 94 Showplace Exhibition Map" (no date shown) (4 pages).

Document entitled "Tamarack Affixing Equipment integrated with an Aquaflex press for GenForms" dated Aug. 1, 1997, and letters dated Jul. 2, 1997, Jul. 10, 1997, Aug. 1, 1997 and Sep. 3, 1997 (6 pages).

Drawing No. 970709–1, entitled "Proposal for Aquaflex Press" and dated Nov. 22, 1999 (1 sheet).

Document entitled "GenForms Purchase Order" and dated Feb. 4, 1998 (1 page).

Letter on Aquaflex stationary to a Mr. Quinlan and dated Mar. 25, 1998 (2 pages).

Drawing No. DP–1935 entitled "Flexo Press BX 1305" and dated Mar. 24, 1998 (1 sheet).
Document on Tamarack stationary entitled "Invoice" having No. 940817, addressed to Uarco Incorporated, and dated Aug. 17, 1994 (2 pages).
Document on Tamarack stationary entitled "Invoice" having No. 940815, addressed to Uarco Incorporated, and dated Aug. 15, 1994 (2 pages).
Undated Document on Tamarack stationary entitled "Tamarack Label Applicator Accessories" (1 page).
Document on Tamarack stationary entitled "Invoice" having No. 941221, addressed to Uarco Incorporated, and dated Dec. 21, 1994 (1 page).
Document on Tamarack stationary entitled "Invoice"having No. 940625, addressed to Uarco Incorporated, and dated Jun. 24, 1994 (3 pages).
Document on Tamarack stationary entitled "Purchase Order" having No. 940202, addressed to Tamarack Products, and dated Feb. 1, 1994 (2 pages).
Document on Tamarack stationary entitled "Purchase Order" having No. 940201, addressed to Tamarack Products, and dated Feb. 1, 1994 (1 page).
Document having a Uarco Incorporated header and entitled "Purchase Order No. BA–067631, consisting of 10 pages," addressed to Tamarack Products, Inc., dated Dec. 13, 1993, and unsigned by Tamarack Products, Inc. (10 pages).
Black and white photographs having handwritten noted and of unknown date and author (3 pages).
Document entitled "Interoffice Memo" from a Steve Kreuzer to a George Zehner and dated Dec. 27, 1994 (1 page).
Document entitled "Interoffice Memo" from a Steve Kreuzer to a Don Sanders and dated Feb. 3, 1995 (1 page).
Document entitled "Interoffice Memo" from a Steve Kreuzer to a George Zehner and dated Mar. 7, 1995 (3 pages).
Untitled document from a Steve Kreuzer to a Jim Krones and dated Mar. 7, 1995 (3 pages).
Document entitled "Interoffice Memo" from a Steve Kreuzer to a George Zehner and dated Mar. 20, 1995 (2 pages).
Document entitled "Interoffice Memo" from Steve Kreuzer to "Distribution" and dated Jul. 21, 1995 (1 page).
Document entitled "Interoffice Memo" from a Steve Kreuzer to George Zehner dated Jan. 19, 1996 (1 page).
Document entitled "Interoffice Memo" from a Steve Kreuzer to a Jim Reutter dated Jan. 19, 1996 (1 page).
Document entitled "Interoffice Memo" from a Steve Kreuzer to a Tony Gallagher dated Aug. 2, 1996 (2 pages).
Black and white photographs having handwritten notes and of unknown date and author (3 pages).
Letter on Tamarack stationary from a Janet Wigodner addressed to a Ray Turnbull dated Jul. 8, 1993 (1 page).
Letter on Tamarack stationary from a David Steidinger addressed to a Jim Reed Dated Mar. 6, 1996 (2 pages).
Document on Tamarack stationay entitled "Tamarack Label Applicator Mark Andy Inc., Proposal 1" dated Mar. 5, 1996 (2 pages).
Document on Tamarack stationary entitled "Tamarack Label Applicator Mark Andy Inc., Proposal 2" dated Mar. 5, 1996 (2 pages).
Drawing entitled "Tamarack Label Applicator Section . . . " with unknown notes and of an unknown date and author (1 page).
Letter on GenForms & Labels stationary from a P.J. Quinlan to a David Steidinger dated Dec. 3, 2001 having handwritten notes of an unknown date (1 page).
Black and white photographs haivng handwritten notes and of unknown date and author (1 page).
Unsigned letter on Tamarack stationary from a Janet Wigodner to a Tony Dolci dated Dec. 9, 1993 (1 page).
Letter on Tamarack stationary from a Jane Wigodner to a Dave Barbee date Jun. 6, 1994 (1 page).
Document entitled "Tamarack Affixing Section 1994 Quotation for Rand McNally" (2 pages).
Unsigned Interoffice Memo from a Janet Wigodner to a Mark Steidinger dated Jul. 13, 1994 with handwritten notes of an unknown date (2 pages).
Letter on Tamarack stationary from a Janet Wigodner addressed to a Dave Barbee dated Jul. 21, 1994 (1 page).
Document entitled "Tamarack Affixing Section–1994 Quotation for Rand McNally Revised Jul. 21, 1994" (2 pages).
Fax document addressed to a Daniel Presseault dated Jun. 9, 1997 having handwritten notes and drawings (1 page).
Document entitled "Infosheet: One Page Profile" having a handwritten date of Jun. 9, 1997 (1 page).
Letter on Aquaflex stationary from a Daniel Presseault addressed to a P.J. Quinlan dated Jun. 24, 1997 (2 pages).
Letter on Tamarack stationary from a Tom Slager to a Daniel Prusseaulte dated Jul. 2, 1997 (1 page) with two drawings dated Jul. 1, 1997 and having handwritten notations (2 pages).
Unsigned letter to a Dave Paularena from an unknown author dated May 24, 1997 (1 page).
Letter on GenForms & Labels stationary from a P.J. Quinlan to a Dominique Quellet dated Apr. 8, 1998 (2 pages) enclosing two samples (2 pages).
Letter on Aquaflex stationary from a Daniel Presseault to a P.J. Quinlan dated Apr. 10, 1998 (1 page) enclosing a hand drawing dated Apr. 10, 1998 (1 page).
Letter on Aquaflex stationary from a Dominique Oueet to a P.J. Quinlan dated May 19, 1998 (1 page).
Letter on Aquaflex stationary from a Dominique Ouellet to a P.J. Quinlan dated May 20, 1998 (1 page).
Unsigned letter on Tamarack stationary from a Ron McManus to a Dominque Ouellet dated May 20, 1998 (1 page).
Aquaflex Drawing No. DP–1935, entitled "Flexo Press BX 1305(*)" and dated Mar. 24, 1998 (1 page).
Unsigned letter from a Janet Wigodner to a Mr. Bruce Driver dated Jan. 24, 1994 (2 pages).
Letter on Tamarack stationary from a David J. Steidinger to a Mr. Tom Yeager dated Sep. 25, 1997 (2 pages).
Ivars Sarkans, "In–Line Finishing Customizes Forms," *Business Forms, Labels & Systems*, Sep. 1991 (2 pages).
*Form*, Sep. 1996 (2 pages).
*Business Forms, Labels & Systems*, Jan. 20, 1997 (3 pages).
Tamarack Brochure having a footer reading "Print '97 McCormick Place, Chicago" (2 pages).
*Innovation*, Issue 2 dated Summer 1997 (4 pages).
Document entitled "Bielomatik —Web–Finishing Machine" (pp. A656–667).
Letter on Bielomatik stationary from a Marty Papertec to a Mr. Greatname (1 page) with flyer (6 pages).
Document entitled "Introducing the Tamarack VERSA–WEB P500 Labelexpo '98 —Booth #2729" (1 page).
Letter on Tamarack stationary from a Gayle Harrop to a Jim Schulty dated Feb. 6, 1998 (2 pages) enclosing document entitled "Tamarack Finishing Equipment" dated Feb. 6, 1998 (4 pages).

Letter on Tamarack stationary from a Gayle Harrop to a Jim Schulty dated Mar. 10, 1998 (1 page) enclosing document entitled “Tamarack Affixing Equipment” dated Mar. 9, 1998 (2 pages).
Unsigned letter on Tamarack stationary from a Janet Wigodner to a Jeanne Iglesias dated Jul. 27, 1993 having a handwritten notation dated Jul. 27, 1993 (1 page) enclosing document entitled “Label/Form Combinations–New Ideas for the Growing Market” (8 pages).
Letter on Tamarack stationary from a Janet Wigodner to a Mr. Bob Evans date Apr. 25, 1994 (2 pages).
Unsigned letter from a David Steidinger to a J. Buster Weinzierl dated Apr. 19, 1994 (2 pages) enclosing document entitled “Tamarack Label Applicator –1994 Quotation for Belknap Business Forms” (2 pages).
Unsigned letter on Tamarack stationary from a David Steidinger to a George Bekemeyer dated May 6, 1994 (2 pages). Enclosing drawing entitled “Concept ‘A ’” of unknown date (1 page) and drawing entitled “Concept ‘B ’” of unknown date (1 page).
Letter on Tamarack stationary from a Mark Steidinger to a Wayne Sample dated Jun. 24, 1994 (1 page) enclosing document entitled “Tamarack Label Applicator–Proposal for IDC Corp. –1994 Quotation” (3 pages).
Steidinger, David, “Integrated Equipment,” *Speaker Handouts—FormsTech Horizon ’97* (6 pages).
Drawing No. 971017–1, dated Oct. 16, 1997 (1 page).
Letter on Tamarack stationary from a David J. Steidinger to a James E. Reed dated Feb. 20, 1997 (2 pages) enclosing document entitled “Tamarack Affixing Equipment for Mark Andy–Feb. 20, 1997” (3 pages).
Document on Tamarack stationary entitled “Tamarack Affixing Equipment–Installed on a Mark Andy Press for National Ticket–Oct. 1, 1997” (2 pages).
Letter on Tamarack stationary to a Mr. Lippman dated Dec. 3, 1996 (1 page).
Unsigned letter on Tamarack stationary to a Mr. Schulty dated Jun. 25, 1997 (1 page).
Unsigned and unaddressed form letter on Tamarack stationary dated Aug. 4, 1997 (1 page).
Unsigned and unaddressed form letter on Tamarack stationary dated Aug. 22, 1997 (1 page).
Document entitled “Tamarack Products, Inc. Booth 4236, McCormick Place South Demonstration Schedule for Print ’97” and dated Dec. 1997.
Photograph of Tamarack booth at Print ’97 in Sep. 1997 (1 photo).
Document entitled “Tamarack Web Finishing Equipment for Integral Cards” (1997) (1 page).
Document entitled “Produce Integral Cards with the Tamarack Label Applicator” (no date shown) (1 page).
Document entitled “Introducing the Tamarack VERSA–WEB™ P500 Labelexpo ’98—Booth #2729 (Scitex Digital Printing Booth)”(1998) (1 page).
Photograph of a Didde Press (no daate known) (1 photo).
Document entitled “Innovation”and dated “Summer 1997” (4 pages).
Letter on Tamarack stationary to a Mr. Gallagher dated Jan. 25, 1993 (3 pages).
Letter on Tamarack stationary to a Mr. Gallagher dated Apr. 21, 1993 (2 pages).
Document on Tamarack stationary entitled “1993 Prices” (1 page).
Unsigned letter to a Mr. Maynard dated Jul. 10, 1963 (3 pages) with document entitled “Option 1: Tamarack Label Applicator for Uarco Jul. 5, 1996” (5 pages), document entitled “Option 2: Tamarack label Applicator for Uarco Jul. 5, 1996” (6 pages) and document entitled “Option 3: Tamarack Label Applicator for Uarco Jul. 5, 1996” (4 pages).
Unsigned letter on Tamarack stationary to a Mr. Casper dated Aug. 13, 1993 (3 pages).
Document on Tamarack stationary entitled “Tamarack Affixing Equipment Installed In–Line on Press 1993 Quotation” (3 pages).
Document on Tamarack stationary entitled “Tamarack Affixing Equipment Installed In–Line on Press 1993 Quotation” (1 page).
Letter on Tamarack stationary to a Mr. Clark dated Jun. 18, 1994 (2 pages).
Unsigned letter on Tamarack stationary to a Mr. Foye dated Jul. 29, 1994 (1 page).
Unsigned letter on Tamarack stationary to a Mr. Foye dated Feb. 16, 1995 (2 pages) with document entitled “Tamarack Label Applicator Moore Business Forms Feb. 10, 1995” (5 pages).
Letter on Webtron stationary to a Ms. Whitely dated Feb. 10, 1995 (1 page).
Letter on Tamarack stationary to a Mr. Neal dated Feb. 24, 1995 ( 2 pages) with document on Tamarack stationary entitled “Tamarack Label Applicator Moore Business Forms Feb. 20, 1995” (4 pages).
Document on Tamarack stationary entitled “Tamarack Label Applicator Moore Business Forms Feb. 10, 1995” (2 pages).
Letter on Tamarack stationary to a Mr. Campbell dated Jan. 15, 1993 (2 pages).
Letter on Tamarack stationary to a Mr. Sweet dated Oct. 18, 1993 (2 pages).
Unsigned letter to a Mr. Campbell dated Jan. 24, 1994 (2 pages).
Letter on Tamarack stationary to a Mr. Reed dated Mar. 6, 1996 (2 pages) with document on Tamarack stationary entitled “Tamarack Label Applicator Mark Andy, Inc.” (5 pages).
Unsigned and incomplete letter to a Mr. Paularena dated May 24, 1997 (1 page).
Letter on Aquafalex stationary to a Mr. Quinlan dated Jun. 24, 1997 (2 pages).
Document entitled “Tamarack Affixing Equipment Integrated with an Aquaflex Press for GenForms Aug. 1, 1997” (2 pages).
Drawing No. DP–1853 entitled “Flexo Press BX 1305”and dated Jun. 17, 1997 (2 sheets).
Unsigned letter on Tamarack stationary to a Mr. Powell dated Jan. 23, 1995 (2 pages).
Memo to a Ms. Janet dated Feb. 24, 1995 (1 page).
Letter on Stevens International stationary to a Mr. Steidinger dated Jun. 25, 1996 (2 pages).
Letter on Tamarack stationary to a Mr. Lawrence dated Jun. 12, 1996 (2 pages) with document entitled “Spot The Ball” (1 page).
Memo to a Ms. Janet W., Mr. Mark S., Mr. Don S., Mr. Tom S., and Mr. Ron M. dated Jun. 7, 1996 (1 page).
Letter on Tamarack stationary to a Mr. Powell dated Jul. 8, 1996 (2 pages) with document entitled “Tamarack Label Applicator for J&C Moores Jul. 5, 1996 Quotation”(3 pages).

Letter on Tamarack stationary to a Mr. Lawrence dated Apr. 23, 1996 (2 pages).
Unsigned letter on Tamarack stationary to a Mr. Powell dated Jul. 1, 1996 with drawing (3 pages).
Document entitled "Tamarack Finishing Equipment AmeriPrint Feb. 6, 1998"(4 pages).
Letter on Tamarack stationary to Mr. Schulty dated Mar. 10, 1998 (1 page) with document entitled "Tamarack Affixing Equipment integrated iwth an Aquaflex Press for AmeriPrint Mar. 9, 1988" (2 pages).
Photograph of Uarco Press 391 no date known (1 photo).
International Search Report for International Application No. PCT/US99/19475 dated Mar. 9, 2000 (2 pages).
International Search Report for International Application No. PCT/US00/27990 dated Oct. 10, 2000 (2 pages).
Chicago Tag & Label, Inc.'s Response to Malessa's First Set of Interrogatories, Mar. 31, 2003 (12 pages). PP. 1, 11–21.
Chicago Tag & Label, Inc.'s Supplemental Response to Malessa's First Set of Interrogatories, Including exhibits, Jun. 24, 2003 (13 pages). pp. 1–6, 8–14.
Transcript of Patrick J. Quinlan's Deposition, Aug. 27, 20003 (11 pages). pp. 1, 14–52, 63–65.
Transcript of James Schulty's Deposition, Jun. 6, 2003 (16 pages). pp. 1, 59–107, 177–181.
Transcript of Davis Steidinger's Deposition, Jun. 19, 2003 (14 pages). pp. 1, 32–63, 103–104, 110–119, 181–185.
Transcript of Steve Kreuzer's Depostion, Sep. 8, 2003 (21 pages). pp. 1, 9–84, 90.
Transcript of David W. Paularena's Deposition, Aug. 29, 2003 (5 pages). pp. 1, 52–54, 75–76, 92.
Fax from P.J. Quinlan to Dave Paularena dated May 24, 1997 (1 page).
Letter to P.J. Quilan from Natasha Stone on Webtron stationery dated Feb. 2, 1998 (1 page) enclosing Machine Order and Contract dated Feb. 2, 1998 (2 pages).
Drawing No. DP–1853 entitled "Flexo Press BX 1305" with handwritten markings and dated Jun. 17, 1998(1 sheet).
Letter on Aquaflex stationery to Mr. Quinlan from Daniel Presseault hand dated Apr. 10, 1998 with hand drawing titled "Proposal for 'Preferred Customer Club" (2 pages).
Drawing No. DP–1945–1 entitled "Flexo Press BX 1308(4)"dated Jul. 29, 1998 with photographs attached (3 sheets).
Letter on Tamarack stationery from Gayle Harrop to a Jim Schulty dated Feb. 14, 1998 enclosing document entitled "Tamarack Affixing Equipment" dated Mar. 9, 1998 (2 pages).
Document entitled Uarco General Requisition No. 36556 dated Nov. 10, 1994 (1 page).
Document entitled "Interoffice Memo" from a George Zehner to a Don Sanders and dated Mar. 3, 1995 (1page).
Photograph of Uarco Press 391, as marked by Mr. Kreuzer during his deposition on Sep. 8, 2003 (1 photo).
Document entitled "Interoffice Memo" from a Steve Kreuzer to a Van Kleinman dated Nov. 2, 1995 (1 page).

* cited by examiner 10
12
14
15
16
18
20
22
24
26
28
30
32
34
36
38

14
15
40
42
44
46
48
50
52
56

60
62
64
66

54

58

METHOD AND APPARATUS FOR PRODUCING MULTIPLE DIE-CUT BUSINESS FORMS

This is a continuation, of prior application Ser. No. 10/004,510, filed Nov. 2, 2001, which is a continuation of application Ser. No. 09/700,065, filed Jan. 16, 2001, now Pat. No. 6,389,971, which is based on PCT/US99/19475, filed Aug. 26, 1999, which is a continuation of application Ser. No. 09/199,512, filed Nov. 25, 1998, now Pat. No. 6,182,572, which is a continuation-in-part of application Ser. No. 09/143,927, filed Aug. 29, 1998, now abandoned, which are hereby incorporated herein by reference in their entirety.

FIELD OF THE INVENTION

The present invention generally relates to a method and apparatus for manufacturing business forms and, more particularly, to a method and apparatus for producing multiple-die cut business forms for a variety of applications.

BACKGROUND OF THE INVENTION

U.S. Pat. No. 4,379,537 to Lomeli et al. discloses a business form with a removable label and a method for producing the same. According to the Lomeli et al. patent, a paper substrate in the form of either individual sheets or a continuous strip is fed into a paper processing apparatus. The paper process apparatus produces the business form having a removable label disposed thereon by a method comprising the steps of imprinting information on the paper substrate, applying transfer tape to the paper substrate, die cutting the substrate to form a label, and subsequently collating, cutting, or storing the resulting product. The disclosure of U.S. Pat. No. 4,379,537 is hereby incorporated by reference herein.

There are various devices that are currently available for producing business forms such as integrated labels in accordance with, for example, the method and apparatus disclosed in the Lomeli et al. patent. A number of such devices are commercially available from a company called Tamarack. The Tamarack devices produce a number of different types of business forms including label/form combinations, integrated labels, integral cards, fold and seal mailers, stencil/form combinations, continuous envelopes, affixed windows, promotional forms, and the like. A source of pin-feed paper having pin hole punching disposed at a generally uniform interval along both sides of the paper allow it to be fed through the device. Such Tamarack devices generally include a pin-feed paper infeed unit, a vacuum applicator unit, an unwind unit containing transfer tape, a hot melt applicator head, a feed control unit, and integral die cut unit, a hot melt unit, and a roll/fold/sheet delivery unit. Typically, the pin-feed paper that is fed into the Tamarack device is manufactured on a separate piece of equipment that, most usually, is owned and operated by a separate company from the company that runs the Tamarack device.

What is desired is an improved method and apparatus for manufacturing multiple die cut business forms.

SUMMARY OF THE INVENTION

It is desirable to provide a printing press that produces multiple die cut business forms in a variety of output configurations directly from stock paper via a continuous web, in-line process.

Such a printing press that produces multiple die cut business forms from stock paper via a continuous web, in-line process has a number of advantages. First, the costs of manufacturing business forms are reduced because the forms are produced with one piece of equipment. Second, the costs of manufacturing business forms is reduced because there is no need to perform any secondary operations on the stock paper fed into the printing press such as line hole punching. Third, the labor costs associated with manufacturing business forms are significantly reduced because a lesser number of personnel is needed to run the printing press during operation and there is no need for any separate affixing operations.

It also is desirable to produce a partially processed business form with a printing press such as, for example, the above-referenced printing press by a method including the steps of providing a glassine substrate, silicone treating the glassine substrate, and applying adhesive directly to the silicone treated glassine substrate.

Producing a partially processed business form in this manner has a number of advantages. First, the silicone treated glassine substrate can be utilized in printing presses as, for example, described herein with minimized curling. Second, pressure sensitive labels manufactured in accordance with this process can be utilized more effectively because, for example, the label can be easily removed from the substrate.

Other features and advantages of the invention will become apparent from the description that follows.

DETAILED DESCRIPTION OF THE PREFERRED EMBODIMENT

Figures 1, 2, 3, 4, 5, 6, 7, 8:
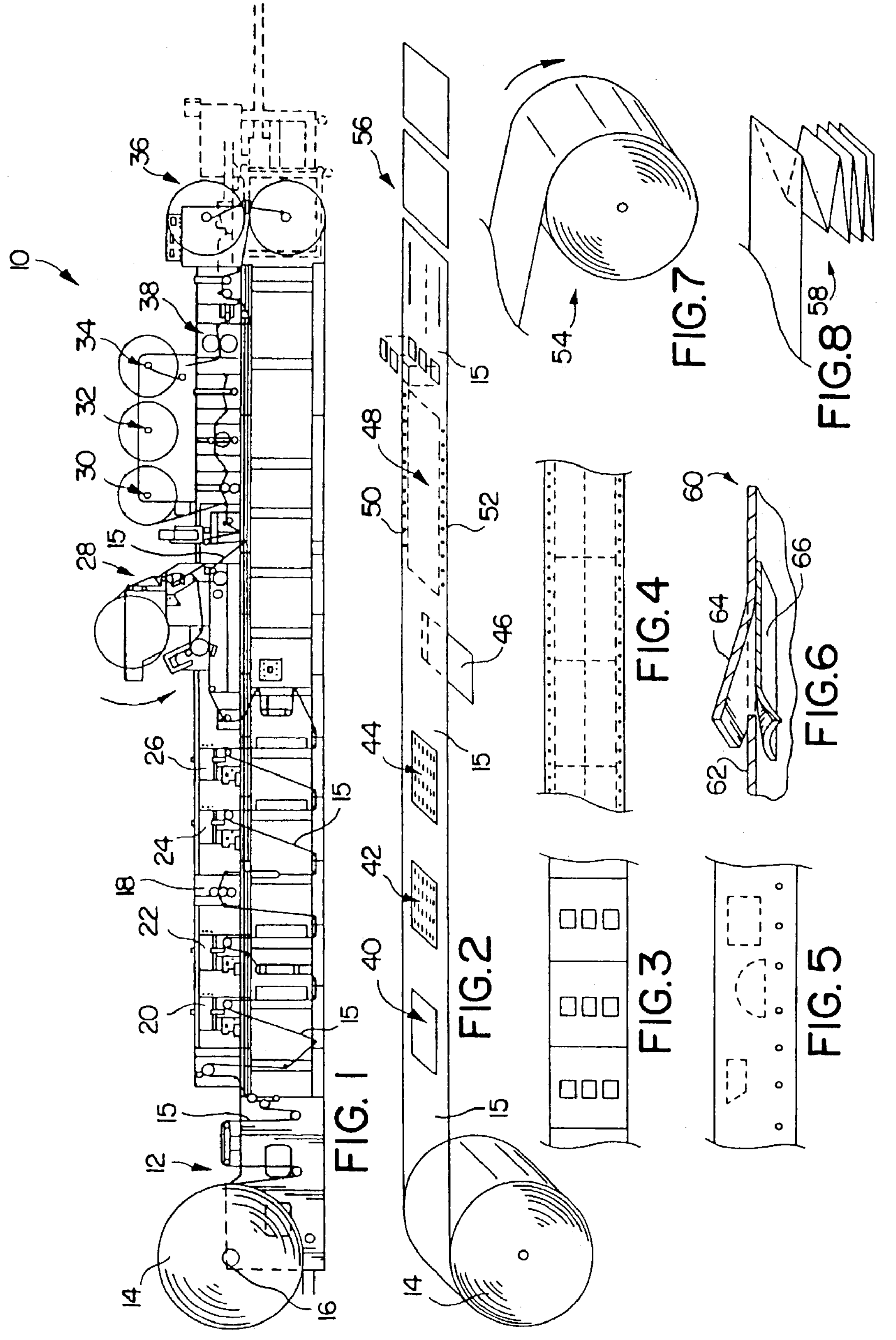
FIG. 1 is a side view of one embodiment of a printing press that is used to manufacture multiple die cut business forms according to the principle of the present invention.
FIG. 2 is a schematic diagram that illustrates various operations that are performed by the printing press shown in FIG. 1.
FIGS. 3–5 illustrate three embodiments of multiple die cut business forms that can be produced by the printing press shown in FIG. 1.
FIG. 6 is a partial sectional view of one embodiment of a multiple die cut business form that is produced by the printing press shown in FIG. 1.
FIGS. 7–8 are perspective, diagrammatic illustrations of manners for collating or storing the multiple die cut business forms produced by the printing press shown in FIG. 1.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

A side view of one embodiment of a printing press 10 that is used to manufacture multiple die cut business forms according to the principle of the invention is shown in FIG. 1. Printing press 10 comprises a number of individual stations that perform specified functions and are connected together by a continuous web 15 so that, for example, multiple die cut business forms may be manufactured in a variety of output configurations directly from a source of stock paper as described in greater detail hereafter.

Printing press 10 includes a receiver station 12 upon which a source of stock paper is mounted. In the embodiment shown in FIG. 1, the stock paper source comprises a roll 14 of stock paper that is rotatably mounted on receiver section 12 by means of axle 16. Printing press 10 is used to manufacture multiple die cut business forms directly from the stock paper roll 14 without the need for any secondary processing such as line-hole punching or separate affixing operations prior to beginning the manufacturing process.

Printing press 10 includes two printing stations 20 and 22 that are connected to the receiver station 12 by means of a continuous web 15. A die cutting station 18 is connected to the printing stations 20 and 22 by the continuous web 15. Two printing stations 24 and 26 are connected in series by the continuous web to die cutting station 18. The continuous web 15 connects an adhesive strip-patch station 28 to printing station 26. Adhesive strip-patch units suitable for use with the present invention are commercially available from a company called Tamarack (Wauconda, Ill.).

Three post adhesive patch die cutting stations 30, 32, and 34 are connected in-line with the adhesive strip-patch station 28 by the continues web 15 as shown. The continuous web 15 connects a finishing station 36 to the third post adhesive patch die cutting station 34 via punching station 38 as shown in FIG. 1. The various stations 14–34 and 38 perform various operations in a predetermined order so that various types of multiple die cut business forms may be produced in the output configuration specified by finishing station 36 as discussed in greater detail hereafter.

One aspect of the present invention is that a roll of glassine paper may be utilized as the roll of stock paper 14 shown, for example, in FIG. 1. Glassine paper is supercalendered, is manufactured principally from chemical wood pulps which have been beaten to secure a high degree of stock hydration, has a smooth finish, and is transparent. The physical make-up of glassine paper allows it to have a high degree of resistance to the passage of air, to be almost impervious to the passage of water vapor, and to be grease resistant. Glassine paper can be provided in various colors and, if desired, can be made opaque by the addition of various fillers as readily apparent to those of ordinary skill in the art to which this invention pertains. A glassine paper substrate is provided with a silicone treatment which typically may be accomplished at the mill where the substrate is manufactured. This allows, for example, pressure sensitive labels to be manufactured with reduced curling.

FIG. 2 is a schematic diagram that illustrates various operations that are performed by the printing press shown in FIG. 1. Paper from the stock paper roll 14 may be die cut by die cutting station 18 in any desired shape as, for example, shown at location 40. Preferably, the shape of the operation performed by die cutting station 18 is dictated by the type of business form being produced by the printing press 10 in a particular application. Locations 42 and 44 indicate examples of printing operations that can be performed by printing stations 20, 22, 24, and 26. It should be noted that printing stations can perform a variety of printing operations including, for example, multi-color printing as readily apparent to those of ordinary skill in the art to which this invention pertains.

One aspect of the present invention that provides significant cost advantages is that the printing press 10 totally eliminates the use of stand-alone, off-line affixing which typically is accomplished by means of a communicator, a web attacher, or other off-line affixing equipment that is totally separate from a prior art printing press. Utilization of the printing press 10 to manufacture multiple die cut business forms allows affixing to occur either on the front of a form to produce a reverse-frame stencil or on the back of the form to produce an integrated stencil via a totally in-line process.

Referring back to FIG. 2, the adhesive strip-patch unit 28 allows an adhesive patch 46 to be removably affixed to the paper backing from the stock paper roll 14. Unit 28 may be programmed to allow patch 46 to have any desired length and shape. Die cutting units 30, 32, and 34 perform post-adhesive patch/strip operations as needed in accordance with the type of multiple die cut business form being prepared in a particular application as desired and as shown at location 48. Punching station 48 is provided in the continues web from receiver station 12 to finishing station 36 to allow the multiple die cut business forms to be produced by printing press 10 in a given application to have line-hole punching as shown at 50 and 52 or preformations. FIGS. 3–5 show additional examples of the die cutting and punching operations that can be performed by die cutting stations 30, 32, and 34 as well as punching station 38. One aspect of finishing unit 36 is to process the multiple die cut business forms produced by printing press 10 in one of three output configurations: output roll form as shown at 54 in FIG. 7, cut sheet form as shown at 56 in FIG. 2, and fan-fold form as shown at 58 in FIG. 8.

FIG. 6 is a partial sectional view of one embodiment of a multiple die cut business form 60 that is produced by the printing press shown in FIG. 1. Business form 60 includes a substrate portion 62 that is die cut by the die cutting station 18 to form a die cut portion 64. An adhesive patch 66 is secured to a desired portion of the business form 60 as shown.

The functions provided by the various stations of printing press 10 can be applied in any desired way to allow a variety of different types of business forms to be produced as discussed in greater detail hereafter. For example, one unique aspect of the present invention is that an adhesive patch can be applied to an integrated stencil, label, or pocket as well as delivering a finished product at the end of the printing press in cut sheet, continuous, or roll form which obviates the need for line-hole punching or any other secondary operations to be performed on the stock paper that is mounted on receiver station 12.

Another aspect of the present invention is to allow multiple die cutting operations to be performed on a cut-sheet integrated label, stencil, pocket or the like while simultaneously printing graphics on the form, both prior to and after the application of an adhesive patch as well as post-operation die cutting and perforating. Materials suitable for use in the printing press 10 in this case include, for example, plastic, films, tough papers, tags, card stocks, vinyl, stencil material and the like. Additionally, an easy-removal thumb notch can be provided in a business form while it is being manufactured in-line in the printing press 10 by means of the die cutting stations 18 and 30, 32, and 34 both prior to and after the application of the adhesive patch by station 28.

Integrated stencils can be manufactured by printing press 10 in continues, cut sheet, or roll form by affixing stencil material in-line while simultaneously printing the form graphics, then die-cutting the back of the stock and removing the die cut material. This also provides the option of forming a label for address identification by die cutting the stencil material and leaving ties so that, for example, a die cut round cornered rectangle remains in the form after direct contact, non-contact, or thermal imaging processing.

Another aspect of the present invention is that the printing press 10 can be utilized to provide horizontal perforations at predetermined intervals on multiple die cut business forms that are processed by finishing station 36 either in cut sheet, continuous fan-folded, or roll form. Applications of the present invention in this context includes invoices, packing lists, bills of lading, letterhead and the like. In this case, the business form is provided with two labels, one of which would be formed so that it could be immediately removed during use and placed on an envelope on which will be printed the name and the address of the recipient and the sender. The other label would be formed by a die cut with a perforation around its perimeter, with or without a thumb notch. The second label has the sender and recipient information reversed. Such business forms are particularly useful for any formal document that would have to be executed and returned to the sender such as, for example, legal papers or mortgage documents.

Figure 9:
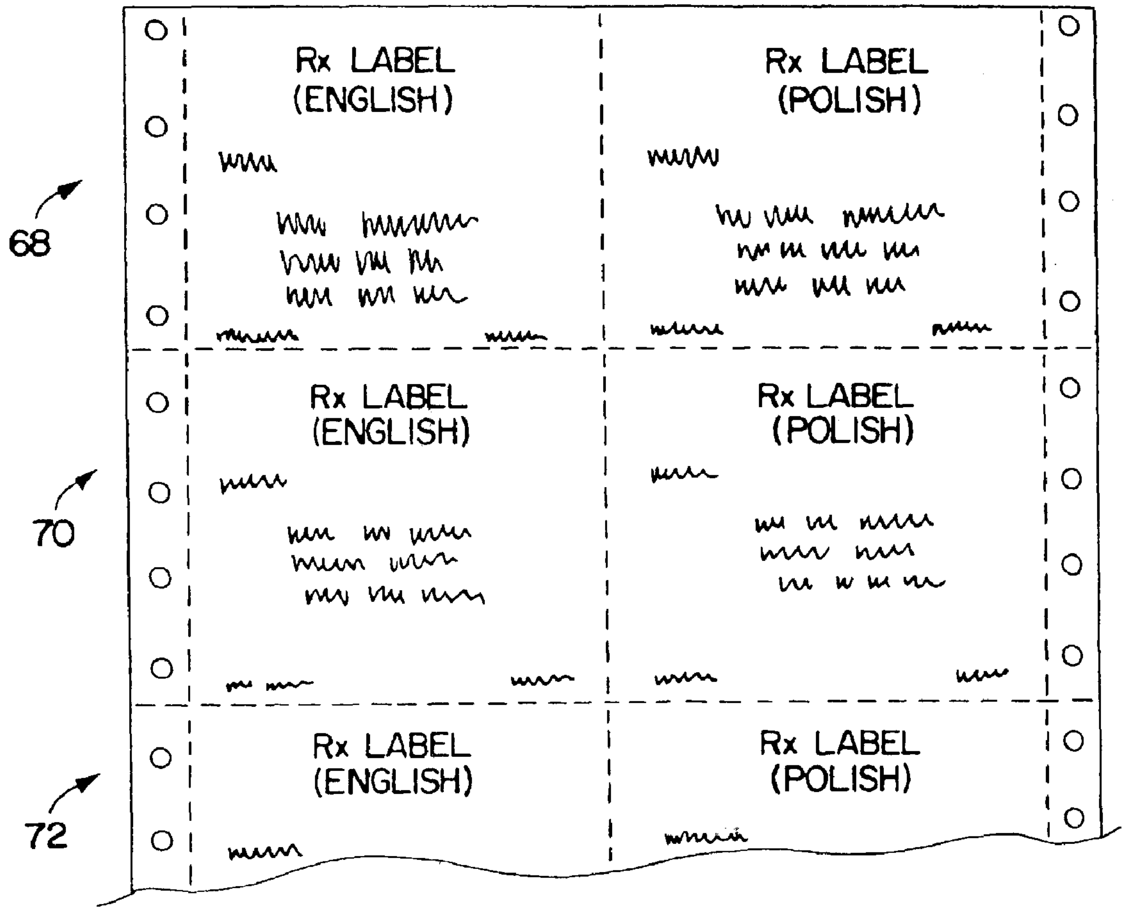
FIGS. 9–10 illustrate exemplary multiple die cut business forms comprising a dual-language pharmacy label according to one aspect of the present invention.
Figure 10:
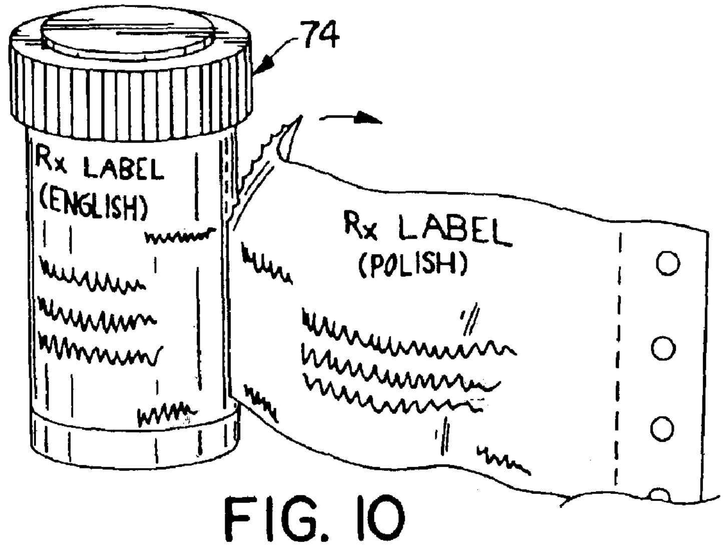

Referring to FIGS. 9–10, exemplary multiple die cut business forms comprising a dual-language pharmacy label according to one aspect of the present invention are illustrated. FIG. 9 shows three pharmacy labels 68, 70, and 72 all of which include two sections having the same information printed in different languages. FIGS. 9 and 10 show the English and Polish languages. The line-hole punching provided on both sides of the pharmacy labels is useful for dot-matrix printing or other line-hole type printing applications. However, it should be appreciated that this feature is optional because, for example, of the widespread use of laser printers. In any case, one side of the pharmacy label includes adhesive so that it may be bonded to a pill bottle 74 as shown in FIG. 10.

During use, the pharmacist prints the relevant pharmaceutical information in different languages on both sides of each one of the pharmacy labels 68, 70, and 72 and affixes the label to the bottle as shown in FIG. 10. This embodiment of a multiple die cut business form has a number of unique advantages that generally prevent communication difficulties. For example, this embodiment is particularly advantageous in the home health care environment where the patient or domestic workers in the home do not speak the same language or speak different languages than emergency service personnel such as paramedics who service the area in question. For example, in a situation where a Polish speaking person was accidentally over medicated an English speaking paramedic arrived to render assistance, the use of the dual pharmacy labels shown in FIGS. 9–10 allow the paramedic to immediately understand what type of medication was taken. This feature of the present invention allows patients to more precisely follow a prescribed prescription regimen and minimizes the potential danger for accidental over medication or poisoning.

From the foregoing, it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An integrated press for producing printed business forms with at least one integrated, removable portion from a source of stock paper comprising:

a paper supply station in which a roll of stock paper is mounted for rotation about an axis of rotation to unwind to supply a continuous web of paper to run through the integrated press;

at least one printing press station receiving the continuous web of paper and being capable of printing indicia on at least a first selected area of the continuous web of paper as the at least first selected area of the continuous web of paper passes through the at least one printing press station;

at least one adhesive patch station receiving the continuous web of paper and being capable of applying a selected amount of patch material on at least a second selected area of the continuous web as the at least second selected area of the continuous web of paper passes through the at least one adhesive patch station, the at least one adhesive patch station having a patch supply station to supply the selected amounts of patch material to be applied and an adhesive applicator to supply adhesive to selected areas of the selected amount of patch material;

at least one die cutting station receiving the continuous web of paper and being capable of die cutting at least a third selected area of the continuous web, the at least third selected area being contiguous with the patch material as the continuous web of paper pass through the at least one die cutting station order to produce a removable portion of the continuous web of paper to form business forms with at least one integrated, removable portion;

at least one finishing station receiving the continuous web of paper to process the continuous web into a preselected output configuration for the business forms; and at least one punch station receiving a continuous web of paper prior to the at least one finishing station and being capable of removing a selected area of the business form as the continuous web passes through the at least one punch station.

2. An integrated press in accordance with claim 1, wherein the patch supply station includes a receiver in which a roll of patch material is mounted for rotation about an axis.

3. An integrated press in accordance with claim 2, wherein the roll of patch material is a roll of silicone treated paper.

4. An integrated press in accordance with claim 2, wherein the roll of patch material is a roll of glassine paper.

5. An integrated press in accordance with claim 1, wherein the selected areas removed form line-hole punching along edge areas of the continuous web to permit operations on the business forms separate from the integrated press.

6. In integrated press in accordance with claim 1, wherein the preselected output configuration includes an output roll format.

7. An integrated press in accordance with claim 1, wherein the preselected output configuration includes a cut sheet format.

8. An integrated press in accordance with claim 1, wherein the preselected output configuration includes a fan-fold format.

9. An integrated press for producing printed business forms with at least one integrated, removable portion from a source of stock paper comprising:

a paper supply station in which a roll of stock paper is mounted for rotation about an axis of rotation to unwind to supply a continuous web of paper to run through the integrated press;

at least one printing press station receiving the continuous web of paper and being capable of printing indicia on at least a first selected area of the continuous web of paper as the at least first selected area of the continuous web of paper passes through the at least one printing press station;

at least one adhesive patch station receiving the continuous web of paper and being capable of applying a selected amount of patch material on at least a second selected area of the continuous web as the at least second selected area of the continuous web of paper passes through the at least one adhesive patch station, the at least one adhesive patch station having a patch supply station to supply the selected amounts of patch material to be applied and an adhesive applicator to supply adhesive to selected areas of the selected amount of patch material;

at least one cutting station being located prior to the at least one adhesive patch station, receiving the continuous web of paper and being capable of cutting at least a third selected area of the continuous web of paper as the continuous web of paper passes through the at least one die cutting station being located prior the at least one adhesive patch station;

at least one die cutting station receiving the continuous web of paper and being capable of die cutting at least fourth selected area of the continuous web, the at least fourth selected area being contiguous with the patch material as the continuous web of paper pass through the at least one die cutting station in order to produce a removable portion of the continuous web of paper to form business forms with at least one integrated, removable portion; and at least one finishing station receiving the continuous web of paper to process the continuous web into a preselected output configuration for the business forms.

10. An integrated press in accordance with claim 9, further comprising at least one punch station being located prior to the at least one adhesive patch station, receiving the continuous web of paper and being capable of removing the at least a third selected area of the continuous web of paper as the continuous web of paper passes through the at least one punch station.

11. An integrated press in accordance with claim 9, wherein the patch supply station includes a receiver in which a roll of patch material is mounted for rotation about an axis.

12. An integrated press in accordance with claim 11, wherein the roll of patch material is a roll of silicone treated paper.

13. An integrated press in accordance with claim 11, wherein the roll of patch material is a roll of glassine paper.

14. An integrated press in accordance with claim 9, further comprising at least one punch station receiving a continuous web of paper prior to the at least one finishing station and being capable of removing a selected area of the business form as the continuous web passes through the at least one punch station.

15. An integrated press in accordance with claim 14, wherein the selected areas removed form line-hole punching along edge areas of the continuous web to permit operations on the business forms separate from the integrated press.

16. In integrated press in accordance with claim 9, wherein the preselected output configuration includes an output roll format.

17. An integrated press in accordance with claim 9, wherein the preselected output configuration includes a cut-sheet format.

18. An integrated press in accordance with claim 9, wherein the preselected output configuration includes a fan-fold format.

* * * * *